March 16, 1965 G. VOGL 3,173,984
STEREOMICROSCOPE WITH INTERCHANGEABLE AUXILIARY OPTICAL UNITS
Filed March 25, 1960 3 Sheets-Sheet 3

United States Patent Office 3,173,984
Patented Mar. 16, 1965

3,173,984
STEREOMICROSCOPE WITH INTERCHANGEABLE AUXILIARY OPTICAL UNITS
Georg Vogl, Bromma, Sweden, assignor to Svenska Ackumulator Aktiebolaget Jungner, Stockholm, Sweden, a company of Sweden
Filed Mar. 25, 1960, Ser. No. 17,660
Claims priority, application Sweden, Mar. 31, 1959, 3,010/59
2 Claims. (Cl. 88—39)

This application relates to a stereomicroscope and has for an object the provision of an improved stereomicroscope having a binocular field-glass and a common collimating lens for its two systems of rays and several optical auxiliary devices.

A stereomicroscope produces stereoscopic or plastic images of an object under observation. In principle it consists of a binocular field-glass for making observations and a common collimating lens placed in front of its two objectives. Out of the light emitted by the object under observation, the two objectives of the field-glass will collect the beams passing the corresponding half of the collimating lens. The distance between the central rays of the two pencils of rays of the instrument, after having been broken to parallelism by the collimating lens, is generally called the base of the instrument. The focal distance of the collimating lens will determine the plasticity of the stereoscopic image obtained. If the focal distance is long, an inferior plasticity will be obtained in spite of the base perhaps being large, due to the fact that the angle between the main rays emitted by the object will be relatively small, and the other way round. If a large magnification by means of the collimating lens is desired, its focal distance must be made short, but it will then be necessary to decrease the base, as such a collimating lens will have a small diameter. In order to make it possible to vary the magnification and still maintain the base and a large plasticity, a device for changing of the magnification in the form of a Dutch spy-glass or telescope is generally built in between the field-glass and the collimating lens. This spy-glass generally is rotatable around an axis perpendicular to the optical axes of the instrument. By turning the Dutch spy-glass 180° a reduction and a magnification respectively are obtained, and by turning 90° the light will pass through specially arranged openings, and the Dutch spy-glass will thus be cut out.

The field-glass and the device for the changing of the magnification are further generally built together to form one single unit. This unit is arranged to be elevated or lowered in a stand, and the part of it containing the device for the exchange of the magnification is then generally attached to the stand and carries in its turn the field-glass.

The arrangement mentioned above has serious drawbacks, however. It is thus obviously not possible to remove the part containing the device for the exchange of the magnification and apply different additional units instead, which are intended to make the instrument as versatile as may be desired on account of its expensiveness, or on the whole to introduce such units between the field-glass and the collimating lens.

It is, however, possible to do this in the instrument according to the present invention, as its optical devices are suspended in the stand by means of a holder carrying the field-glass. The device for the exchange of the magnification is detachably secured to the holder, and the collimating lens is in its turn detachably secured to the device for the exchange of the magnification, in the form of a unit of its own.

Further the instrument of the present invention is provided with other optical auxiliary devices in the form of separate additional units. All these auxiliary devices as well as the separate units mentioned above are provided with coupling arrangements, which are constructed so as to make it possible to exchange the different units for one another and to attach them in any desired mutual combination.

More particularly, the present invention relates to a stereomicroscope comprising an optical device suspended in a stand in such a way that it may be elevated and lowered and which includes a binocular field-glass and a common collimating lens for its two systems or rays and several optical auxiliary devices. The invention is particularly characterized in that the optical device is suspended in the stand by means of a holder carrying the field-glass, in which holder the two houses of the field-glass are rotatably secured around axes coinciding with the optical axes of their objectives, besides which the collimating lens and the optical auxiliary devices in the form of additional units are arranged to become mutually exchanged and attached to the holder and to each other.

For further objects and advantages thereof and for a more detailed description of the invention, reference may be had to the following description, taken in conjunction with the accompanying drawings in which.

Figure 5:
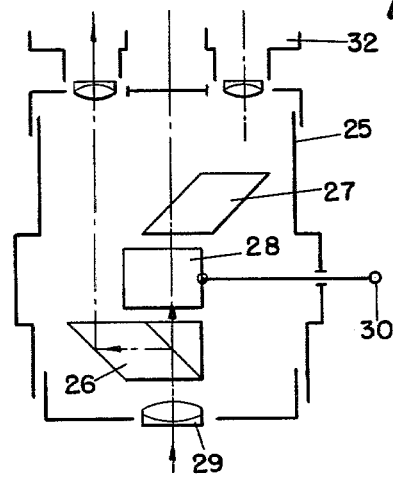
FIG. 5 is a schematic view of an embodiment of a further auxiliary device with a 90° prism arranged to be slid horizontally and adapted to be used in connection with the embodiment of the microscope shown in FIGS. 1 and 2.
Figure 6:
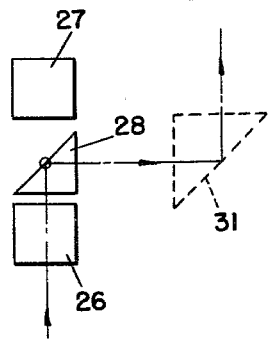
Figure 7:
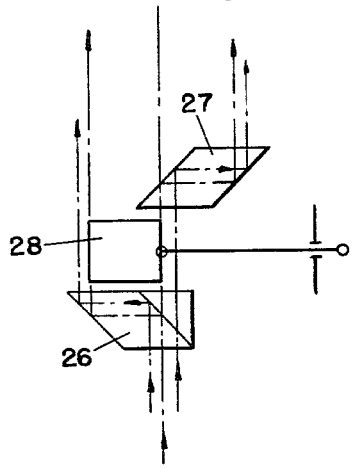
Figure 8:
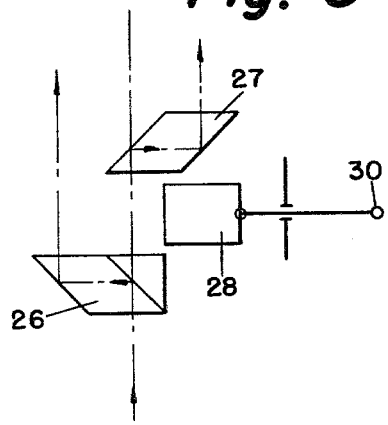

FIG. 6 is a schematic view showing the optical details of the auxiliary device of FIG. 5 turned 90°; and FIGS. 7 and 8 are schematic views showing the 90° prism of FIG. 5 shifted into two different positions from the position as shown in FIG. 5.

Figure 1:
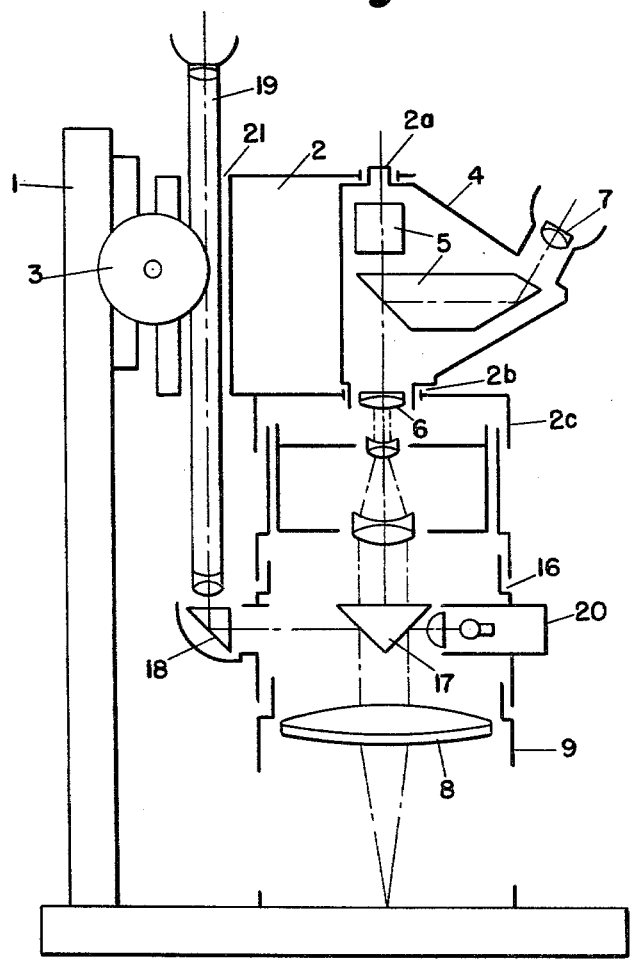
FIG. 1 is a schematic sectional view of one embodiment of the invention showing the microscope together with some of the auxiliary devices seen from one side.

Referring to FIG. 1, there is shown a stand 1 with a holder 2 suspended in such a way in the stand that the holder 2 may be raised and lowered. This action is controlled by means of a wheel 3 and a spindle with a gear acting upon a gear-rack on the stand 1. The holder 2 carries a binocular field-glass 4, both enclosures of which are rotatably secured at points 2a and 2b around axes coinciding with the optical axes of the objectives.

The prism system of the field-glass is designated by reference character 5, and is objective and eye-piece by reference characters 6 and 7 respectively. The holder 2 is further provided with one half, 2c, of a coupling arrangement, by means of which any one of a series of optical devices in the form of separate additional units may be attached, which at one of its ends has a corresponding other half of the coupling arrangement. At their other end these auxiliary devices are provided with coupling halves similar to that of the holder 2. By this means the different additional units may be attached to the holder and/or to one another in any desired combination. The construction of the coupling arrangement is not shown in the drawing and will not be described here in detail, as it may be made in many different ways, for instance in the form of a bayonet joint, and it is not an object of this application.

The collimating lens, designated by reference character 8 is one of the most important constituents of the stereomicroscope. It is fastened in a socket 9 with coupling halves at the ends and thus make a separate unit too. There are even several such collimating lenses with different magnifications and focal distances provided for the microscope, in the form of exchangeable units. The magnification may also be varied by means of a device for the exchange of the magnification in the form of a separate unit, which may be attached for instance between the holder 2 and the collimating lens. It consists of one or more binocular Dutch spy-glasses 10, 14, which are rotatably attached around the axis 11 in a socket 12. This axis consequently is parallel with the optical axes of the spy-glasses 10, 14.

The Dutch spy-glasses or telescopes ("Mirrors, Prisms and Lenses" by James P. C. Southall, 3rd edition D. MacMillan Company, pp. 455–460, 1933) each consists of a large convex object-glass combined with a small concave eye-piece which intercepts the converging rays before they come to a focus and adapts them to suit the eye of the observer.

Figure 3:
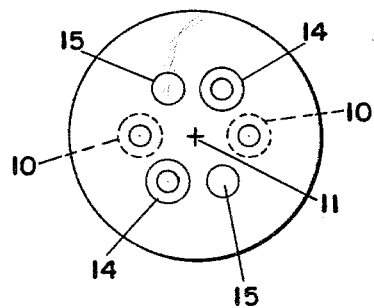
FIG. 3 is a sectional view of a device for the exchange of the magnification shown in FIGS. 1 and 2.

The Dutch spy-glasses, or telescopes, which give different magnifications, may by turning around axis 11 be thrown into the passages of light of the microscope. They are controlled by means of a handle 13. There are also two openings 15 between the spy-glasses, as will be seen in FIG. 3, through which the pencils of rays may be let at the corresponding position of the spy-glasses. When in that position the device for the exchange of the magnification will consequently not change the magnification produced by the field-glass and the collimating lens. The device for the exchange of the magnification constructed as described will be specially suitable for the total construction of this microscope together with its exchangeable optical auxiliary devices, as it will on one hand suit the cylindrical shape of socket 12 and on the other hand decrease the height of the instrument as far as possible.

Figure 2:
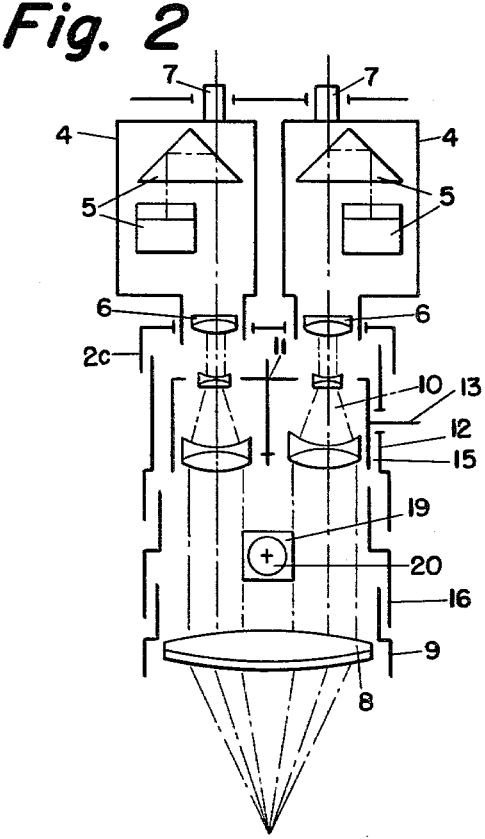
FIG. 2 is a schematic view of the optical elements of the same embodiment turned 90°.

In FIG. 1 and FIG. 2, a further auxiliary device 16 is coupled between the device for the exchange of the magnification and the collimating lens 8. In its socket 16 two prisms 17 and 18 are arranged, which reflect light from the collimating lens 8 into a microscope tube 19 mounted at one side of the instrument (a side microscope). By means of this a second person besides the person working the microscope will be able to make observations, e.g., an instructor. A camera or a similar instrument may also be attached to the side microscope 19. It is an advantage of this arrangement, apart from the different possibilities of application it offers, that it untilizes light from a section of the collimating lens which is not made use of by the stereomicroscope, due to the position of the prism 17. Therefore no light is lost, which is generally the case in connection with other devices for the same purpose. The side microscope 19 is thrust through a bore 21 in the holder 2 and is thus placed in a protected position where it will not vibrate.

It is sometimes desired that the object under observation should be specially lighted, for instance when photographing. This may be accomplished by means of a source of light 20 built into socket 16 and arranged in such a way that the light will be reflected by the prism 17 through the collimating lens and onto the object.

Figure 4:
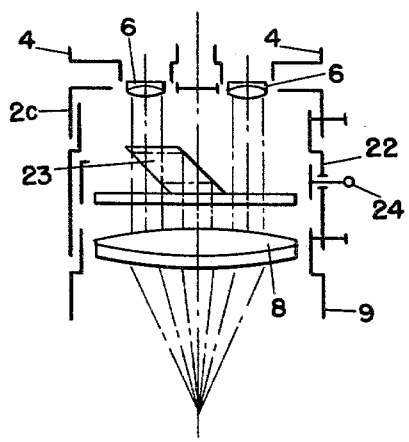
FIG. 4 is a schematic view of an embodiment of an auxiliary device comprising a rotatable rhombic prism, such auxiliary device being adapted for use in the microscope shown in FIGS. 1 and 2.

In FIG. 4 is shown another optical auxiliary device belonging to the stereomicroscope according to the invention and intended to be coupled between the field-glass and the collimating lens. It consists of a socket 22, into which a rhombic prism 23 is built. It is arranged in such a way that it may be thrown into and out of the pencil of rays of field-glass objective 6 by means of handle 24. It is further arranged so as to reflect the beams from the central parts of the collimating lens into the field-glass objective when situated in the former position. The base of the stereomicroscope and consequently its plasticity is obviously decreased thereby. The arrangement thus provides the possibility of quickly changing the plasticity, which is desirable in connection with some observations.

A further optical auxiliary device according to the invention is shown in FIGS. 5–8. It consists of a socket 25 with coupling halves at its ends and built in optical elements like the previously described additional units. The optical elements consist of a dividing prism 26, a rhombic prism 27 and a 90° prism 28 arranged between them. This additional unit is specially intended to be used in such cases when it is desired to increase the magnification by means of a greatly magnifying collimating lens 29. Such greatly magnifying lenses cannot very well be made with a large diameter, and therefore the light from such a lens, generally of a diameter of about 5–15 mm. must be distributed to the two field-glass objectives by means of a special device. In spite of the small size of lens 29 it is possible to maintain the large plasticity of the instrument by constructing the lens with a short focal distance. The distribution of the light from the lens is accomplished by means of prism 26, which consists of one rhombic prism and one 90° prism. They are stuck together and provided with a translucent reflecting joint surface. The dividing prism reflects a pencil of rays direct into one of the field-glass objectives and lets through one pencil of rays to the rhombic prism 27. The last mentioned pencil of rays is reflected by prism 27 into the other field-glass objective. The 90° prism 28 placed between these two prisms may be shifted in a direction perpendicular to the pencils of rays coming from the dividing prism. It is further arranged in such a way that its hypotenuse is struck by the beams under an oblique angle, in this case 45°, when it is thrown into the pencils of rays. The light striking this prism is therefore diverted and will not pass into the field-glass objectives. The displacement is brought about by means of a bar 30.

When the prism 28 has the position shown in FIG. 5 the device is intended to be used for photographing. The pencil of rays passing the prism 26 without being reflected may be reflected by the prism 28 into a camera direct or, as indicated in FIG. 6, via a further prism 31. When photographing, the object may simultaneously be observed through part 32 of the field-glass, in the same way as by means of an ordinary microscope. The other part of the field-glass will receive no light in the meantime.

In FIG. 7 the prism 28 has been thrown into both of the pencils of rays coming from the dividing prism 26, and diverts the beams emanating from half of the collimating lens out of each one of the pencils of rays. This may also be expressed to mean, that the prism 28 screens the right half of the collimating lens from the passage of light of the left house of the field-glass and the left half from the passage light of the right house of the field-glass. Stereoscopic observations may thus be made with the prism 28 placed in this position.

If the prism 28 is entirely pulled out of both of the pencils of rays as shown in FIG. 8, the instrument will function as an ordinary binocular microscope without stereo function as both halves of the collimating lens will then lie within the field of view of both houses of the field-glass.

By means of the device according to FIGS. 5, 6, 7 and 8 it is thus possible, by only a simple operating of handle 30, to adapt the instrument quickly for ordinary microscopic observation, for stereoscopic observation and for photographing. This makes the instrument extremely useful, as it will enable the user to work very quickly even when he wishes to change the function of the instrument several times in order to obtain a definite conception of a difficult-to-estimate object.

It shall be understood that the invention is not limited to the specific arrangement shown and that changes and modifications may be made within the scope of the appended claims.

What is claimed is:
1. A stereomicroscope comprising a stand, a holder carried by said stand, means for raising and lowering said holder, binocular field glass means having a pair of enclosures with objectives and offset oculars for the two systems of rays of said field glass means, said holder having means for rotatably supporting said enclosures of said field glass means so that they are rotatably secured around axes coinciding with the optical axes of their said objectives and said objectives are secured with their optical axes parallel to a central axis and spaced apart on opposite sides of said central axis, said holder having at the lower end thereof coupling structure of predetermined configuration coaxial with said central axis, a first separable unit including an auxiliary optical device and a housing having at the lower end thereof coupling structure of configuration similar to said coupling structure at the lower end of said holder, said housing having at its upper end coupling structure of a configuration meeting with said predetermined configuration, and a second separable unit containing a collimating lens, said second separable unit including a housing having at its upper end coupling structure of said mating configuration so that said housings of said separable units will interfit with each other and with the lower end of said holder with said units in predetermined relationship with said central axis, whereby said separable units may be mutually exchanged and attached to said holder and to each other so as to be raised and lowered as one unit by said holder with respect to said stand, said auxiliary optical device comprising a prism transversely disposed on said central axis in the space between the optical axes of said objectives, said prism having two angularly disposed downwardly facing reflective surfaces, means supported by the housing of said first separable unit for directing light laterally against one of the faces of said prism whereby the light reflects downwardly through the collimating lens of the second separable unit onto an object being viewed, a reflective device externally supported by the housing of said first separable unit in position to receive rays of light from the object being viewed which pass through said collimating lens and are reflected by the other face of said prism through a lateral aperture in the housing of the first separable unit, and a monocular microscope tube supported by said holder externally of the housings in alignment with said reflective device for receiving the last-named rays of light.

2. The combination claimed in claim 1, and a third separable unit including a housing substantially similar in end coupling structure to the housing of said first separable unit, said third separable unit containing an optical device comprising a plurality of Dutch spy glass means disposed therein on the arc of a circle coaxial with said central axis and intersecting the optical axes of said objectives, and means supported by the housing of said third separable unit for swinging said Dutch spy glass means about said central axis.

References Cited in the file of this patent

UNITED STATES PATENTS

| | | |
|---|---|---|
| 1,807,613 | Bauersfeld et al. | June 2, 1931 |
| 1,958,280 | Patterson et al. | May 8, 1934 |
| 2,517,170 | Bernard | Aug. 1, 1950 |
| 2,720,138 | Michel et al. | Oct. 11, 1955 |
| 2,765,702 | Sachtleben | Oct. 9, 1956 |
| 2,901,943 | Tackaberry | Sept. 1, 1959 |
| 3,062,099 | Fench | Nov. 6, 1962 |

FOREIGN PATENTS

| | | |
|---|---|---|
| 1,021,882 | France | Dec. 10, 1952 |
| 1,107,626 | France | Aug. 10, 1955 |
| 713,243 | Great Britain | Aug. 11, 1954 |
| 117,807 | Switzerland | Dec. 1, 1926 |